US008439066B2

(12) United States Patent
Burmester (10) Patent No.: US 8,439,066 B2
(45) Date of Patent: May 14, 2013

(54) DOUBLE SEAT VALVE CAPABLE OF CLEANING THE SEAT AND HAVING A CLEANING DEVICE FOR A HOUSING PENETRATION

(75) Inventor: Jens Burmester, Grambek (DE)

(73) Assignee: Tuchenhagen GmbH, Buechen (DE)

( * ) Notice: Subject to any disclaimer, the term of this patent is extended or adjusted under 35 U.S.C. 154(b) by 309 days.

(21) Appl. No.: 12/736,211

(22) PCT Filed: Mar. 16, 2009

(86) PCT No.: PCT/EP2009/001886
§ 371 (c)(1),
(2), (4) Date: Sep. 20, 2010

(87) PCT Pub. No.: WO2009/115255
PCT Pub. Date: Sep. 24, 2009

(65) Prior Publication Data
US 2011/0005611 A1   Jan. 13, 2011

(30) Foreign Application Priority Data
Mar. 20, 2008   (DE) .................... 20 2008 003 976 U (51) Int. Cl.
*F16K 1/44* (2006.01)
*F16K 25/00* (2006.01)
(52) U.S. Cl.
USPC ...................... 137/240; 137/614.18
(58) Field of Classification Search .......... 137/238, 137/240, 614.18
See application file for complete search history.

(56) References Cited

U.S. PATENT DOCUMENTS

| | | | |
|---|---|---|---|
| 5,904,173 A * | 5/1999 | Ozawa | 137/240 |
| 6,089,255 A * | 7/2000 | Bonnefous et al. | 137/312 |
| 7,905,253 B2 * | 3/2011 | Burmester et al. | 137/614.18 |

FOREIGN PATENT DOCUMENTS

| | | |
|---|---|---|
| DE | 38 35 944 | 4/1990 |
| DE | 297 16 881 | 1/1998 |
| WO | WO 92/21900 | 12/1992 |

OTHER PUBLICATIONS

International Search Report PCT/EP2009/001886; Jun. 8, 2009.

* cited by examiner

*Primary Examiner* — Kevin Lee
(74) *Attorney, Agent, or Firm* — Merek, Blackmon & Voorhees, LLC (57) ABSTRACT

The invention relates to a double seat valve capable of cleaning the seat and having a cleaning device for a housing penetration critical for cleaning, According to the invention, a double seat valve of generic type ensures cleaning of the housing penetration of the pipe shaft or the pipe shaft expanded into a pressure compensation piston of the independently driven first closing element, starting from the valve housing part to an axial extension length of at least the entire opening stroke of the double seat valve, and the related relevant prior art is thus improved. This is achieved according to the invention in that, when a first closing element (3) is moved downward by the first partial stroke (T1), a freely penetrable ring gap (S21) is formed between an outer surface (K) of the pipe shaft (3b/3c) and a first rod seal (21) disposed in the first valve housing part (1a).

14 Claims, 5 Drawing Sheets

DOUBLE SEAT VALVE CAPABLE OF CLEANING THE SEAT AND HAVING A CLEANING DEVICE FOR A HOUSING PENETRATION

CROSS-REFERENCE TO RELATED APPLICATION

The present application claims the priority under 35 U.S.C. 119 of German Application No. 20 2008 003 976.2, filed Mar. 20, 2008, which is hereby incorporated herein by reference in its entirety.

TECHNICAL FIELD

The invention relates to a double seat valve capable of cleaning the seat having a cleaning device for a housing penetration which is critically important for cleaning, wherein the double seat valve is equipped with two movable closing members, which are serially arranged and which can be moved relative to each other, and which in the closed position of the double seat valve prevent overflow of the fluids from one valve housing part into another and limit both in the closed and in the open position a leakage cavity that is connected with the of the double seat valve; wherein in the closed position, the first closing member, which is constructed as a sliding piston, is accommodated to form a seal in a connection opening which joins the valve housing parts to each other, and during the course of its opening movement, it is accommodated to make a sealing contact with a second closing element arranged on a second seat surface; wherein the latter is also transferred during the further opening movement into a fully opened position, which creates a seal radially relative to a cylindrical first seat surface formed in the connection opening, with closing members which are transferable independently of each other through a partial stroke across the gap in a seat cleaning position for cleaning of their surfaces. Also, the second closing member can be transferred with a second partial stroke with the equidirectional second partial stroke and the first closing member by the opening movement against the directed first partial stroke into the relevant seat cleaning position, wherein the double seat valve, which is opened upward relative to a vertical arrangement, is equipped above with adjusting rods which can be actuated for both closing members, and wherein a discharge bore, which is arranged in a penetrating pipe shaft on the first closing member which seals the first valve in the downward direction, is connected with the region surrounding the leakage cavity, and wherein the seat cleaning position of the first closing member is open at the same time and can be cleaned between the pipe shaft and the first valve housing part.

The second closing member can be at the same time designed as a slide piston which is equipped with a radially acting sealing means, wherein the associated cylindrical second seat surface is preferably also constructed as a connecting opening. However, the second closing member can be also designed as a seat disk which is axially or axially/radially sealed on an associated flat or conical second seat surface. The valve rods of both closing members are as a rule aligned coaxially to each other, as mentioned above, and jointly led from the second valve housing part and introduced into the drive.

PRIOR ART

From DE 38 35 944 C2 is known a double seat valve of the type having the characteristics described above enabling to clean the seat, in which the first closing member, which is constructed as an independently driven slide piston, can be transferred during the course of the cleaning of the associated seat with the opening movement against the directed first partial stroke into its cleaning position. The second closing member, which is dependently driven, is designed as a seat disk which forms a seal on an associated seat surface, and it can be transferred with the opening movement of the equidirectional second partial stroke into its seat cleaning position. The double seat opens in the upward direction, relative to its vertical arrangement position.

A penetrating pipe shaft of the lower valve housing part, which creates a seal in the downward direction, is increased in size when moved in the penetration region to create a cylinder, a so called pressure compensation piston, in such a way that an annular surface is created on the upper side of the pressure compensation piston, which is approximately the same as the adjacent annular surface on the lower side of the first closing member. A free circular gap is formed, between the outer surface of the pressure compensation piston and a lower annular insertion of the valve housing part which is to be formed later, in the upward direction when the closing member is moved downward in the seat cleaning position, through which the adjacent annual insertion on the housing side can be cleaned, together with the seal of the pressure compensation piston that is arranged on the side of the housing in the exposed position of the seat region of the first closing member.

The known cleaning device of the critical housing penetration of the pressure compensation piston is unsatisfactory because the relevant seal is exposed during the cleaning process when it is fully extended from the pressure compensation piston in such a way that it is projected into the inner part into of the valve housing (see in particular FIG. 7a). Therefore, it is thus exposed to the current forces almost without any protection. The cleaning effect in the area of the seal is in this case less intensive than in the free circular gap between the lower annular insert of the valve housing and the pressure compensation piston, because a significantly lower current speed of the cleaning agent is realized in the seal region in comparison to the much larger cross-sectional area.

A cleaning device is also constructed in connection with a chamber that is connected to the lower annular insert, which is sealed from the pipe shaft penetrating on the lower side. Since the device can be fully cleaned with the pressure compensation piston, the product brought during the course of the repeated opening and closing strokes into the penetration region of the pressure compensation piston must be removed by cleaning. The cleaning agent which is collected on the bottom of the chamber, or mixed with the product, is furnished through radial bores in the pipe shaft which has an outlet bore, and it is carried away together with the cleaning agent/product resulting from the seat cleaning into the area surrounding the double seat valve. The possibility of a so called residue buildup in the chamber above the seal opposite the pipe shaft up to the lower edge of the radial bore cannot be excluded.

Cleaning of the valve rod of the upper, second closing member in the area of its penetration through the associated upper valve housing part is not provided, as this area is not considered critically important with respect to product deposition even according to currently accepted teachings regarding safety as will be explained later.

Essentially, it can be stated that the housing penetration of the pipe shaft, or the penetration in this area or form of a pipe shaft which is constructed as a pressure compensation piston of an independently driven, first closing member, is more critical than the corresponding penetration with a dependently driven, second closing member. This is due to the fact that the first closing member is constantly moving during the opening stroke in the direction of the second closing member and the associated valve rods or pressure compensation piston of the first closing member are thus displaced from the penetration region and moved into the associated valve housing. The opposite relationship is created when one considers the second closing member: parts of the associated valve rod or of the valve rod, which is constructed in the form of a pressure compensation piston, are moved in the range of the movement of the opening stroke from the associated valve housing part into the penetration area. If the product is encountered in both valve housing parts, the increased carrying over of the product into the associated penetration region of the valve rods or of the pressure compensation piston of both closing members is inevitable. However, if a cleaning fluid is employed after the passage of the product, the parts of the valve rod or of the pressure compensation piston projecting into the second closing member are already cleaned and they will thus be also cleaned during the opening stroke or the partial stroke in the associated penetration.

If no cleaning is provided on the first closing member for its pipe shaft, or for the pipe shaft which is expanded to create a pressure compensation piston, then it would be perhaps possible to clean during the seat cleaning process of the first closing member the regions of the pipe shaft, or of the pressure compensation piston extending into the associated valve housing part, because the seat cleaning is performed with the partial stroke in the direction against the opening movement. The regions in the penetration region, or regions of the pipe shaft or of the pressure compensation piston which can be contaminated with the product are thus moved during the cleaning of the associated seat further out and they will not be subjected to cleaning. During the subsequent travel of the product, with the full opening stroke of the double seat valve, these contaminated regions are driven into the first valve housing part, which can then lead to a recontamination of the product.

According to currently accepted standard theories about safety with respect to double seat valves, which are employed in particular in the area of foodstuffs and drinks with higher requirements on the hygiene during the processing, the cleaning of the pipe shaft or of the pipe shaft which is expanded to a pressure compensation piston in the relevant area of the independently driven is performed with the first closing member, wherein the cleaning can be performed either simultaneously with the seat cleaning or at certain time interval.

For example in technical applications in the dairy industry, the relevant FDA regulations are an obligatory requirement for double valves having a seat cleaning capability, which stipulate that simultaneously with the seat cleaning of an independently driven, first closing member, the cleaning of the associated pipe shaft or of a pipe shaft which is expanded to a pressure compensation piston must be also performed.

The object of the present invention is to ensure that with a conventional type of a double seat valve, cleaning of housing penetration of the pipe shaft will be performed which is critical with respect to the cleaning performance, or of pipe shaft which is expanded to create a pressure compensation piston, of an independently driven first closing member, starting from the valve housing part and continuing up to the axial extension length comprising at least the entire opening stroke of the double seat valve, and thus to improve the prior art described above.

SUMMARY OF THE INVENTION

The objective is achieved with a double seat valve which has the characteristics described in claim 1. Preferred embodiments of the double seat valve which has a seat cleaning capability according to the invention are described in dependent claims.

The basic concept according to the invention is in this case based on the idea, that a ring gap that is freely penetrable in the axial direction, is formed for the first closing member, which is moved downward during the first partial stroke between an outer surface of the pipe shaft and a first seal, referred to as the first rod seal, which seals this pipe shaft and is arranged in a first valve housing pipe. The cleaning of the critical housing penetration of the pipe shaft is performed in a known manner simultaneously with the seat cleaning of the first closing member that is constructed as a slide piston, namely as an independently driven closing member. For this purpose, the first closing member is moved opposite its first opening direction by a first stroke from its closing position so far from the connection opening in the downward direction into the first valve housing part until the associated cylindrical valve seat is opened through the width of the gap to enable cleaning. The movement of the pipe shaft in the area of the first rod seal thus results in a corresponding synchronous partial stroke movement.

The gap formation in this area can be basically achieved according to two methods. Specifically, according to one method, this can be achieved either with a radial recess on the peripheral surface of the pipe shaft in this area, or with an axially limited annular and groove-shaped notch having in any case a sufficiently radial depth forming the gap. The axial dimensions of a recess or a notch are in this case such that the first rod seal arranged on the side of the housing is fully exposed in the seat cleaning position.

A second method can be in principle also used to realize the formation of the gap in the relevant region, so that the first rod seal is arranged on the pipe shaft, and its exposure in the seat cleaning position is achieved so that the first rod seal is then positioned in a notch on the side of the housing which has adequate axial dimensions.

When the pipe shaft is designed so that the first rod seal penetrates the region in the form of a pressure compensation piston, which is provided in one preferred embodiment, having an annular surface oriented towards the first closing member which is approximately identical to the adjacent annular surface on the lower side of the first closing member, the characteristics described above are transferred to the gap formation in the area of the first rod seal when this is practical based on the configuration.

A high stability of the first rod seal, in particular from the viewpoint of a secure embedding in the valve housing, and an optimal formation of the temporary annular gap between the pipe shaft or the pressure compensation piston on the one hand and the first rod seal on the other hand, is in another embodiment form due to the fact that the first rod seal is designed as a profile seal which is in its basic form provided with a polygonal profile. Moreover, two sides opposite each other, relative to a vertical arrangement position of the double seat valve, are essentially vertically oriented. The radial limiting surfaces of the first rod seal on the outer side and lower side on the housing side and the radial limiting surface on the inner side are limited by the pipe shaft, while the limiting surface on the upper side, with the exception of the area on one seal shoulder, is freely exposed to the inner space of the valve housing part.

The stability mentioned above and the secure imbedding of the first rod seal on the side of the valve are significantly improved when, as was proposed above, the seal is made from an elastic sealing material and a rigid insertion part which is completely enclosed by the elastic sealing part.

In this connection, in another embodiment form according to the invention, an insertion part is provided which is extended, relative to the profile of the first rod seal, substantially upward and radially outward in the upward direction and radially inside, wherein the lower side end of the insertion part forms one part of the limiting surface of the first rod seal on the lower side, having a free end section extended over the radial outer limiting surface of the rod seal so that it is fixed and locked with respect to the form, or the form-locked and force-locked design, with this free end section. The insertion piece mentioned above provides a high stability of the first rod seal and ensures a defined positional fixing of the first rod seal in the radial and axial direction, which has the same effect with the form-locked and force-locked imbedding of the free end section as clamping.

In order to prevent penetration of the product into the joint gap between the first rod seal and the first valve housing from its interior part, a seal shoulder is formed on a radially outer limiting surface of the first rod seal, which is supported toward the inner space of the first valve housing part against this part. In interaction with the insertion part which is to be supported on the lower side of the valve housing, said seal shoulder is pressed against a corresponding surface of the valve housing, so that a gap free imbedding of the first rod seal is achieved in all positions of the double seat valve.

The sealing and rubbing effect of the first rod seal against the pipe shaft or against the pressure compensation piston is particularly efficient and durable when the first rod seal is equipped on its radial inner limiting surface with a radial sealing edge, which is extended inside and created with a circular V shape and to which a flank is connected which is inclined downward, and rebounding outward.

An almost ideal and very effective technical design from the viewpoint of the streaming characteristics is achieved with a temporary formation of an annular gap between the first rod seal and the pipe shaft or the pressure compensation piston when, as was already mentioned in another proposal, said annular gap is limited radially on the inner side by an outer surface of the pipe shaft whose contour is substantially formed as a an opposite contour to the adjacent contour of the first rod seal, which is then exposed opposite the pipe shaft and slack.

A particularly advantageous embodiment of the circular gap is created when the circular, V-shaped sealing edge is positioned in the area of a radial recess or of an axially limited annular and groove-shaped notch, formed on the peripheral surface of the pipe shaft or the pressure compensation piston, and when the pipe shaft under the recess or the notch is created with a diameter which is not reduced, so that a rebounding seal flank is formed in the lower part of the annular gap. The V-shaped seal edge then forms the narrowest location of the annular gap, which creates a narrow, jet-like design upstream seen in the current direction, while a diffused, expanded part is created in the downstream region so that this deep, critical region is subjected to intensive cleaning by the turbulence of the current.

In order to ensure that the pipe shaft or the pressure compensation piston will be cleaned along its entire length and also to protect it from mechanical influences according to another embodiment of this invention, an outlet housing is provided on the lower valve housing part which is detachably connected to it, extended downward and connected to a bushing-shaped outlet housing, which completely accommodates on the inner side in a housing bore the pipe shaft or the pressure compensation piston and surrounds it along the entire accommodated length with an outlet ring gap.

In order to improve the guiding of the pipe shaft or the pressure compensation piston, one front side of the outflow housing oriented toward first rod seal radially encloses the outer side of the insertion part and creates a border for the downwardly extended, rectangular surrounding recess in the housing bore, which penetrates on the inner side in a guiding bore of the pipe shaft, and with its limiting surface on the upper front side lies against the elastic seal part of the first rod seal under pretensioning. The pretensioned contact of the elastic seal part, which acts in the axial direction, ensures with its first guide ring in this area a gap-free and secure imbedding of the first guide ring, so that the guide ring cannot be displaced back from this position by any fluid.

In order to provide a gap-free and secure seal also for the opposite front side of the guide ring against the outlet housing so that the first guide ring cannot be displaced back by any fluid also from this position, it is further proposed to deploy a sealing groove in the boundary surface on the front side of the notch, which accommodates a seal providing a seal in the axial direction of the guide ring.

In order to realize a continuous current path through the first guide ring between the temporary construction of the ring gap and the outflow ring gap, according to an advantageous embodiment of the invention, a plurality of grooves are provided in the guide bore of the first guide ring which are distributed over its circumference, having a longitudinal axis positioned at a gradient angle opposite the parallel boundary surfaces of the first guide ring on the front side.

The special design of the outlet housing on its lower end enables first a separate discharge of the cleaning agent from the seat cleaning current that is used for cleaning of the rods, namely without any buildup of residue in this region. This makes it possible to ensure that the outlet housing on its lower end ends radially in an inner radial projection on its inner side, which enclosed one outlet opening, is penetrated in the closed position or in the seat cleaning positions of the double seat valve by a ring that is connected at the end site to the pipe shaft, and from the outlet bore is opened downward and radially to the inner side.

Other characterizing advantage of the double valve according to the invention will be also shortly mentioned and contrasted with the known seat cleaning-capable double valve with cleaning of the critically important housing penetration of the pipe shaft which is expanded to the pressure compensation piston. The double valve used to realize the means according to the invention does not require any extension of the pipe shaft or of the pressure compensation piston, and also no increase of the stroke is required. The guiding of the pipe shaft or of the pressure compensation piston is improved in comparison to prior art and the outlet housing is fully operated with idling operations. The cleaning of the first rod seal in the relevant regions is significantly improved and it is independent of the stroke. The first rod seal is characterized by a more stabile installed position through the form and reinforcement achieved by means of an insertion part, with the arrangement and clamping created via an insertion part in all positions of the double seat valve, in particular in the seat cleaning position of the first closing member.

BRIEF DESCRIPTION OF FIGURES

The invention will now be described based on preferred embodiments. While the invention can be realized in any number of various embodiment forms, the figures show particularly preferred embodiment examples, which are then described under the condition that these embodiments represent only an example of the invention. However, the invention is not limited to these particular examples.

DETAILED DESCRIPTION OF THE PREFERRED EMBODIMENTS

The double seat valve 1 (FIG. 1) essentially comprises in a preferred embodiment form a valve housing (1) having a first and a second valve housing part 1a or 1b, two mutually independently movable closing members 3 and 4, having associated adjustment rods 3a and 4a, and a seat ring 2, which creates a connection through an inner connection opening 2c (see also FIG. 2) between the valve housing parts 1a, 1b.

The first closing member 3 (an active or independently operated closing member), which is constructed as a slide piston, is sealingly accommodated in the closed position of the double seat valve 1 in a first seat surface 2a formed by the connection opening 2c, which is formed as a cylindrical seat surface. In addition, a first seat seal 6 is provided in the slide piston 3, which cooperates with the first seat surface 2a exclusively under radial preload (radial preload in sliding engagement). The second closing member 4, also constructed as a slide piston, cooperates in the closed position of the double seat valve 1 with a second seat surface 2b, which is cylindrical and formed through an annular recess in the connection opening 2c. The seal is created with a second seat seal 7, which forms a seal radially against the second seat surface 2b also in sliding engagement.

Both closing members 3, 4 form both in the closed position (illustrated in FIG. 1) and in the opened position (illustrated in FIG. 2), in which a full opening stroke H is reached, a leakage cavity 5, which is formed between these members and which is connected with the area surrounding the double valve 1 with a centrically penetrating pipe shaft 3b/3c, which is in turn connected to the first closing member 3. The pipe shaft 3b/3c comprises in an upper part adjacent to the first closing member 3 a connection part 3b, and in its lower part a pressure compensation piston 3c, which is formed as a continuation thereof and provided with an annular front surface, which is oriented toward the first member 3 and approximately identical to the adjacent annular surface on the lower side of the first closing member 3.

The first adjustment rod 3a is usually in the area of the first closing member 3 tightly connected with the closing member with several outlet bores 3d having a star shape which creates traversing bars in the radial direction. Since these bars can have a negative effect or feedback on the relationships in the current and on the formation of the current in the leakage cavity 5, according to the double seat valve 1 of the invention, these mechanically necessary connecting locations between the first adjusting rod 3a and the first closing member 3 are created in the form of multiple cross beams 3h, which are distributed over the circumference so that they are removed by about one piece from the leakage cavity 5, and preferably relocated to the end of the pressure compensation piston 3c that is facing away from first closing member 3. Moreover, the first adjustment rod 3 is concentrically guided through the outlet bore 3d and radially oriented at its end, with an adjustment rode section 3a*, preferably by means of three star-shaped transverses 3h, which are equally distributed over the circumference and firmly connected with a circumferential ring 36 into which the pressure compensation piston 3c is opened on the lower side. It is practical when the cross beams 3h, the ring 3g and the adjustment rod section 3a* are integrated in a weld-on part 30.

Figure 1:
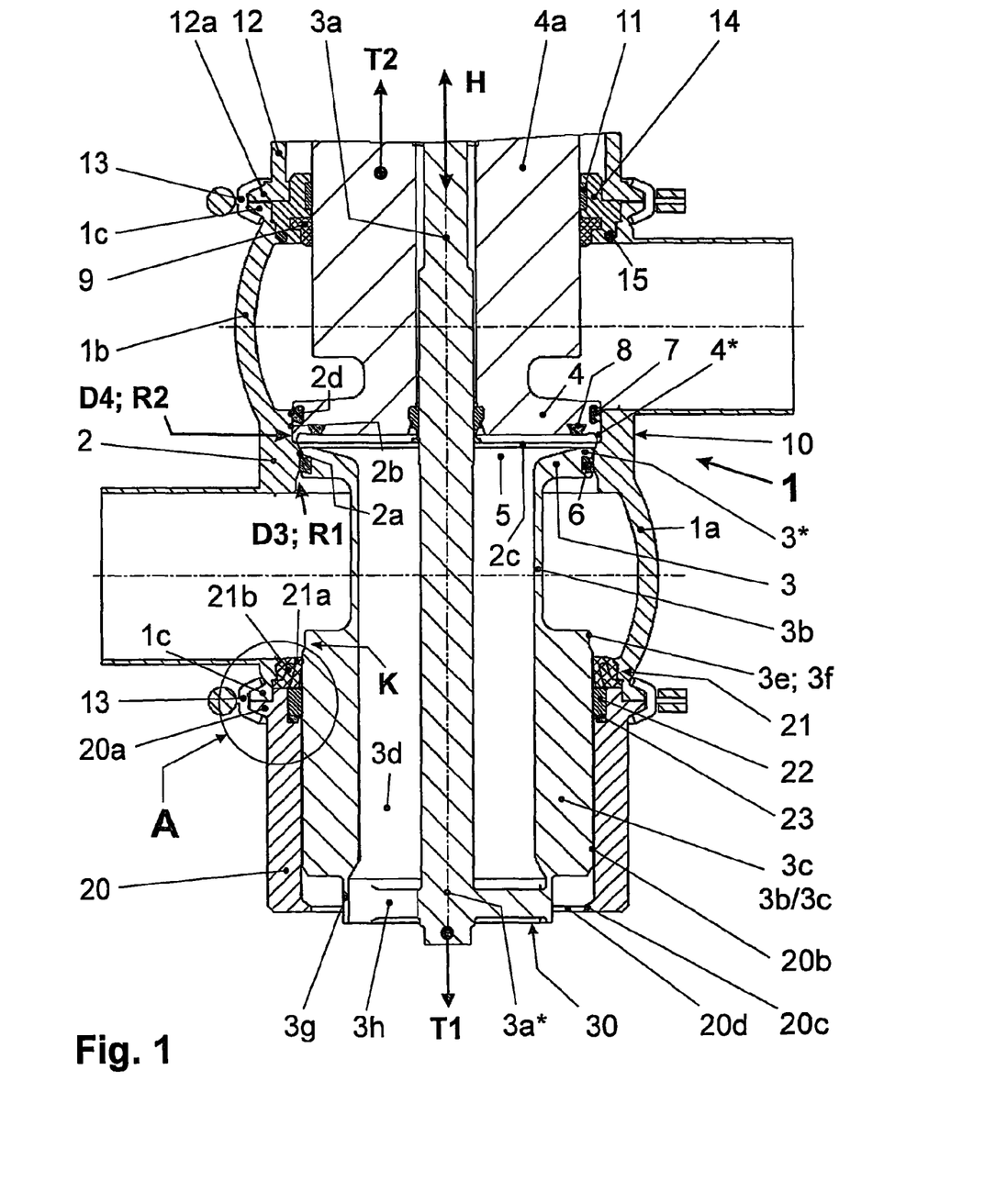
FIG. 1 a meridian section of a preferred embodiment form of the proposed seat cleaning-capable double seat valve according to the invention having a cleaning device for the critically important housing penetration of a pipe shaft which is expanded to a pressure compensation piston and independently driven, indicating a first closing member, wherein the double seat valve is located in its closing position and the drive is not indicated in the figure.
Figure 2:
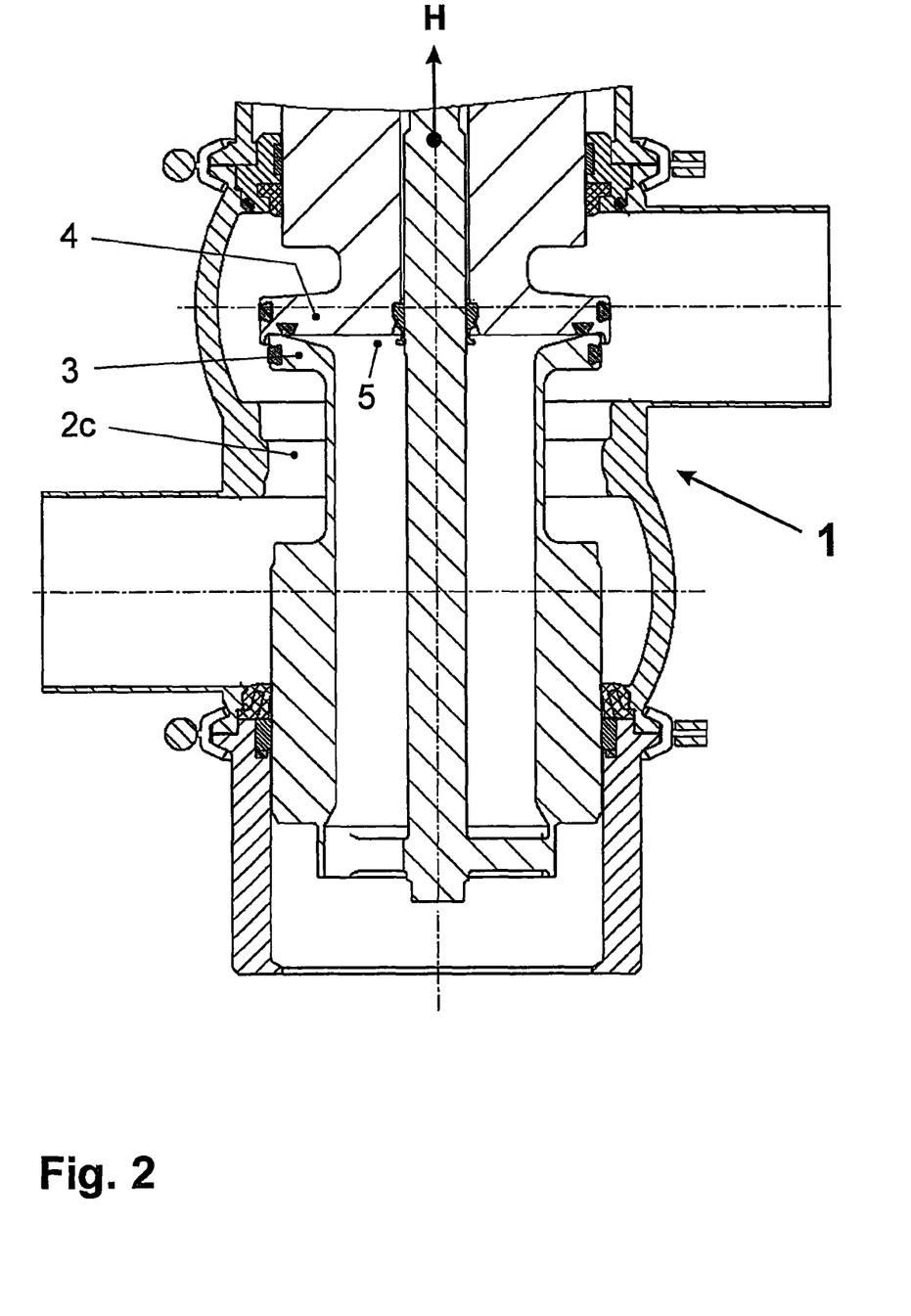
FIG. 2 a meridian section of the double seat valve according to FIG. 1, which is located in the open position.
Figure 4:
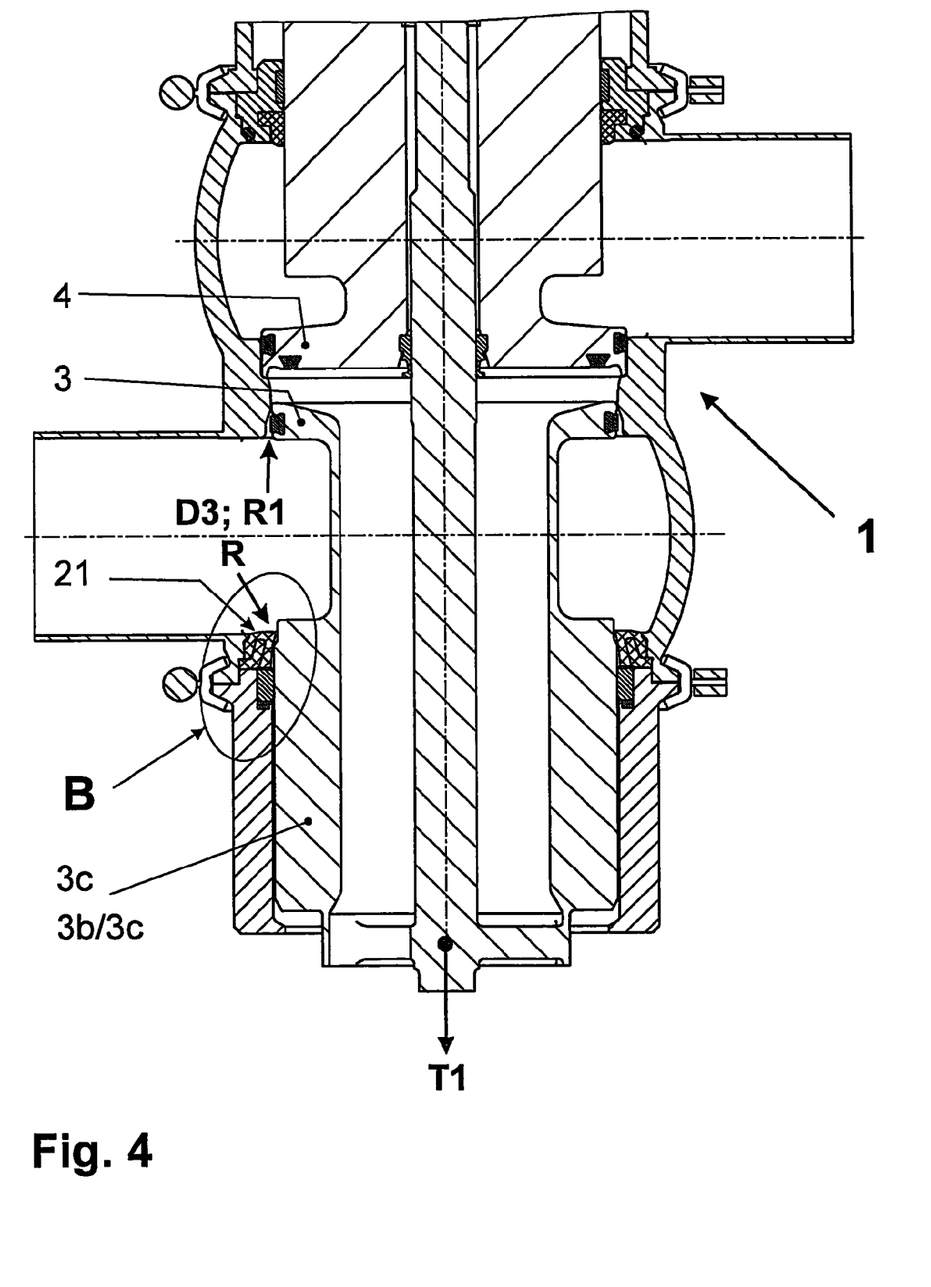
FIG. 4 a meridian section of the double seat valve according to FIG. 1, wherein the double seat valve is located in the seat cleaning position of the first closing member.

Each closing member 3, 4 is equipped on the leakage side with a cylindrical attachment 3* or 4*, which is formed with the associated part of the connection opening 2c in the seat ring 2 of an annular first restricting gap D3 (see FIGS. 1, 4; formed between the first seat surface 2a and an annular second restricting gap D4 (FIG. 1, formed between the second seat surface 2b and the second cylindrical attachment 4"). The first restricting gap D3 is formed when the first closing member 3 is transferred through one of the opening movements opposite the directed first partial stroke T1 into its seat cleaning position (the first one, see FIG. 4, 1). In this first partially open position T1, the cleaning agent flows in the form of a first seat cleaning current R1 from the inner part of the first valve housing part 1a through the associated valve seat of the closing member 3, which is opened throughout the gap width into the leakage cavity 5 and it is carried away from there through the outlet bore 3d into the area surrounding the double seat valve 1.

The second restricting gap D4 is formed when the second closing member 4 is transferred through the opening movement of the directed second partial stroke T2 into its seat cleaning position (the second one, see FIG. 1; the second cleaning position is not indicated). In this second partially open position T2, the cleaning agent flows in the form of a second seat cleaning current R2 from the inner part of the second valve housing part 1b through the associated valve seat of the second closing member, opened throughout the gap width, into the leakage cavity 5, and it will be also transferred from here through the outlet bore 3d into the area surrounding the double seat valve 1.

A center seal 8, which creates a reciprocal seal for the opening and closing movement in the fully opened position H (FIGS. 1 and 2), is arranged on the lower part of the front side of the second closing member 4. The second adjustment rod 4a, formed as a hollow rod, concentrically encloses the first rod 3a and it is mounted through the second valve housing part 1b so that it creates a seal against this part and so that it is guided by means of a second guide ring 11. The second rid seal 9 and the second guide ring 9 are arranged in a sealing ring and guide ring housing 14, which is fixed between the second valve housing part 1b and a lamp housing 12, indicated only partially in the figure, which is form-locked and force-locked, whereby the sealing of the seal ring housing and guide ring housing 14 formed against the second valve housing part 1b is created with a housing seal 15. The lamp housing g12 connects the second valve housing part 1b with a drive, not shown in the figure, which is actuated by adjustment rods 3a, 4a, inserted into the drive. The connection between the second valve housing part 1b and the lamp housing 12 is created by means of a first clamping flange 1c and a complementary clamping flange 12a, which are mutually releasably clamped by means of a so called clamping ring.

Figure 3:
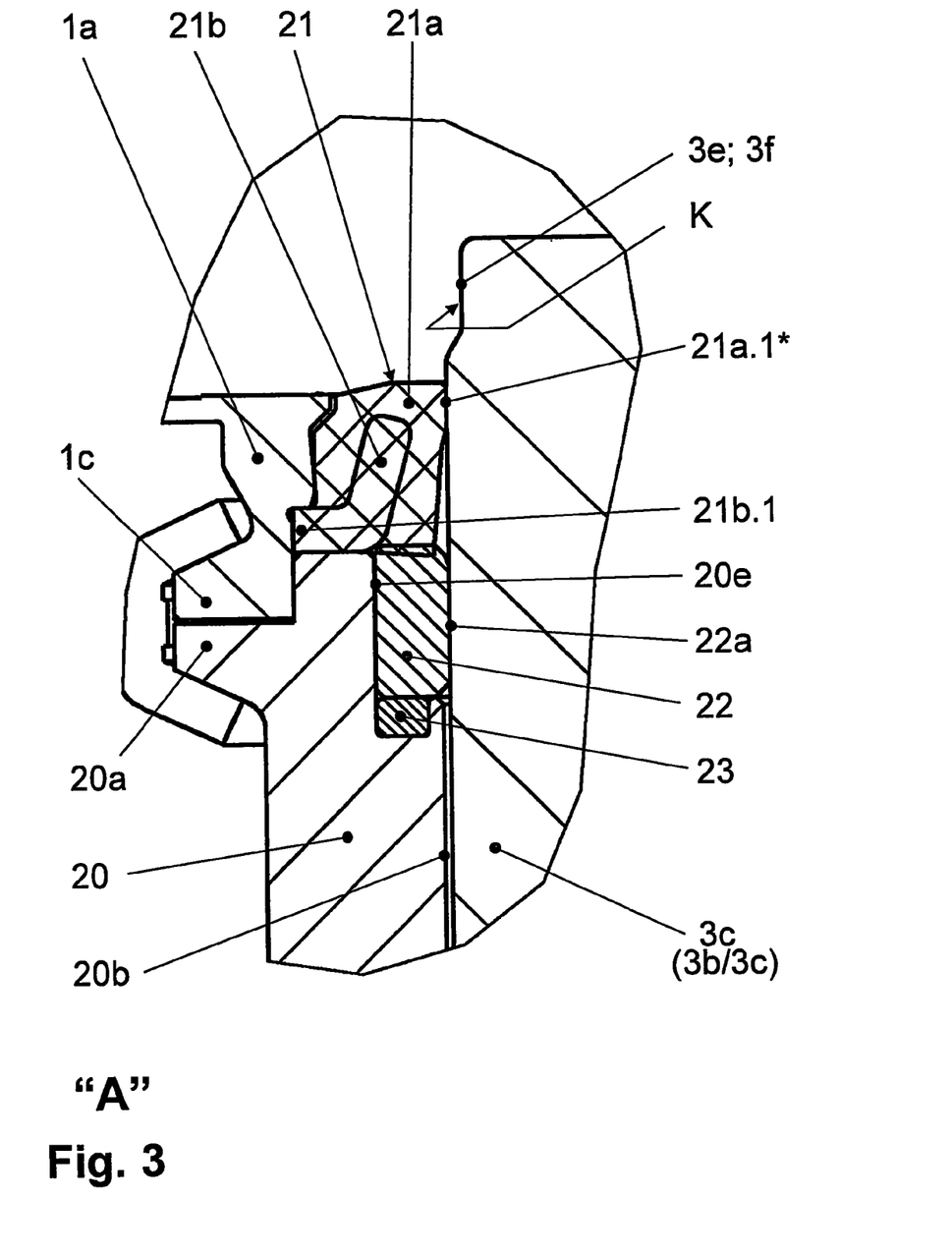
FIG. 3 an enlarged drawing of a sectional representation of the cleaning device, indicated by "A" in FIG. 1, for a housing penetration of a pipe shaft which is expanded to a pressure compensation shaft.
Figure 5:
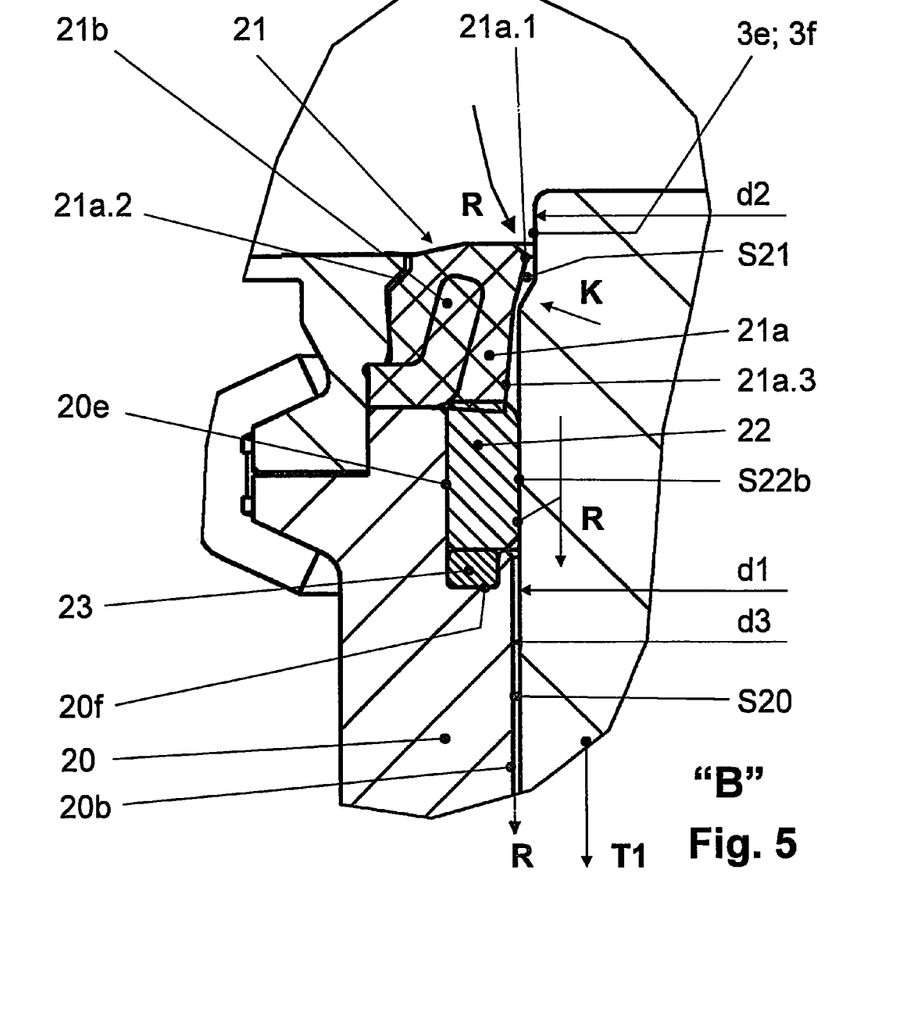
FIG. 5 an enlarged drawing of a sectional representation of the cleaning device, indicated by "B" in FIG. 4, of a pipe shaft which is expanded to a pressure compensation piston, located here in the seat cleaning position of the closing member, and FIG. 6 a first guide ring in a perspective view, which is employed in the cleaning device of the double seat according to FIGS. 1 through 5.

The sealing of the pipe shaft 3b/3c or the pressure compensation piston 3c is created in the area of the penetration through the first valve housing part 1a with a first valve housing part 1a via a first rod seal 21 (FIGS. 1, 3 and 5). This is advantageously formed as a profile seal whose basic form is provided with a substantially polygonal cross-section, whereby two opposing sides, relative to a vertical arrangement position of the double seat valve 1, are mainly vertically oriented. One radial outer and one lower limiting surface of the first rod seal 21 are on the side of the valve housing, and one radial inner limiting surface, removed from the seat cleaning position of the first closing member 3, is limited by the pipe shaft 3b/3c; one upper limiting surface is exposed, with the exception of the region of the seal shoulder 21a.2, to the inner space of the first valve housing 1a.

The first rod seal 21 (FIG. 2, 5, 1) comprises an elastic seal part 21a and a rigid insertion part 21b. The insertion part 12b is extended, relative to the cross-section of the first rod seal 21, in the position indicated in the drawing, essentially in the upward direction and radially outward in the upward direction, and upward and radially inside, wherein the lower ends of the insertion part 21b form a part of the lower limiting surface of the first rod seal 21. The lower end of the insertion part 12 in this case projects with its free end section 21b.1 over the radial outer limiting surface of the first rod seal 21 and it is fixed with its free end section 21b.1 with a form-lock or a force-lock created on the side of the housing.

On the radial outer limiting surface of the first rod seal 21 is formed a seal shoulder 21a.2 (FIG. 5) which is braced toward the inner space of the first valve housing part 1a against this part. The first rod seal 21 is joined to an inwardly projecting, circumferential and outwardly rebounding seal flange 21a.3. In every other position of the double seat valve 1 than in the first seat cleaning position T1, wherein this position creates in the region of the first rod seal 21a temporarily formed ring gap 21 illustrated in FIG. 5, so that the V-shaped seal edge 21a.1 is fully defined, a deformation situation is created for the first rod seal 21 in this region, which is indicated as the sealing position of the circumferential, V-shaped seal edge 21a.1* in FIG. 3.

After the full execution of the first partial stroke T1, that is to say in the first seat cleaning position (FIG. 4), a temporary ring gap S21 is formed (FIG. 5), which is radially limited on the inner side by an outer surface K of the pipe shaft 3b/3c, whose contour is substantially determined as a counter-contour to the adjacent contour of the first rod seal, when it is exposed to the pipe shaft 3b/3c and the pressure is released. Moreover, the circumferential, V-shaped seal edge 21a.1 is positioned in the area of a radial recess 3e or of an axially limited annular and groove-shaped recess 3f, formed on the peripheral surface of the pipe shaft 3/b, wherein the lower part of the recess 3e, or the recess 3f, forms the lower part of the annular gap S21 for the rebounding seal flange 21a.3 with the rear shaft 3b/3c which has an undiminished diameter. The radial recess 3e is provided with a recess diameter d2 (see FIG. 5), while the undiminished pipe shaft 3b/3c, or the pressure compensation piston 3c, are realized with a larger pipe shaft diameter or balancer diameter d1.

To the lower valve housing part 1a is detachably connected a box-shaped outlet housing 20 which is extended in the downward direction (FIG. 1, 3, 5), which accommodates on the inner side in a housing bore 20b the pipe shaft 3b/3c or accommodates fully the pressure compensation piston 3c and surrounds it along its entire accommodated length with an outlet ring gap S20. The radial extension of the outlet ring gap S20 is determined by the half diameter difference between the diameter of the outlet housing bore d3 and the pipe shaft diameter or balancer diameter d1 (FIG. 5). The connection between the lower valve housing part 1a and the outlet housing 20 is created, as was basically already described above in the description of the connection between the second housing part 1b and the lamp housing 12, with the first clamping flange surface 1c and a complementary third clamping flange 20a, which are mutually detachably clamped with another clamping ring 13.

One front side of the housing 20, which is oriented toward the first rod seal 21, is radially outwardly enclosed by an insertion part 21b and it is radially adjacent on the inner side to a notch 20e, which is extended downward and created with a rectangular, circumferential form in the housing bore 20b (FIGS. 3, 5), wherein a first guide ring 22 is arranged in the recess 20e, which is penetrated on the inner side in a guide bore 22a by the pipe shaft 3b/3c or the pressure compensation piston 3c, and which is adjacent with its upper limiting surface on the front side to the elastic seal part 21a of the first rod seal 21 under pretensioning. The relevant elastic deformation region of the first rod seal 21 is shown in the FIGS. 3 and 5 as overlapping the guide ring 22, so that one can see to what extent is the first rod seal 21 deformed in the installed position by the guide ring 22. The contact of the elastic seal part 21a, which is pretensioned and acts in axial direction, ensures with the first guide ring 22 in this area a gap-free and secure imbedding of the first guide ring 22, so that the guide ring cannot be displaced back from this side by any fluid.

Figure 6:
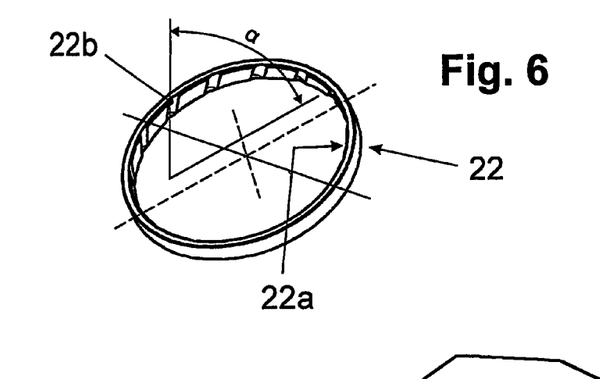

A plurality of grooves 22b (see FIG. 6) are deployed in the guide ring bore 22a of the guide ring 22 so that they are distributed over the periphery. The longitudinal axles of the grooves are arranged at a gradient angle α relative to the parallel limiting surfaces of the first guide ring 22 on the front side. The grooves 22b form a groove-shaped through-gap S22b, which ensures further continuation of the seal cleaning current R (FIGS. 5, 4) that was temporarily formed by the ring gap S21 harvested from the first seal housing part 1a in the outlet ring gap S20.

In the limiting surface of the recess 20e on the front side is provided a seal groove 20f (FIG. 5), in which is accommodated a seal 32 creating a seal in the axial direction. The lower end of the first guide ring 22 is thus also sealed in a gap-free and secure manner against the outlet housing 20, so that the first guide ring 22 cannot be displaced back by any fluid also from this side.

The outlet housing 20 ends at its lower end radially on the inner side in an inner radial projection 20c (FIG. 1), which surrounds an outlet opening 20d, penetrating into the closed position or into the seat cleaning positions T1, T2 of the double seat valve 1 from the ring 3g, from which the outlet bore 3d is opened in the downward direction and radially inward.

It is evident from the description above that various modifications and variants can be realized, without deviating from the gist and the new concept of the present invention. It should be also understand that no limitations are intended by the embodiment forms, which were here illustrated and described, or only described. The disclosure should include all such modifications which are within the claimed protective scope of the claims.

LIST OF REFERENCE SYMBOLS AND ABBREVIATIONS 1 double seat valve
10 valve housing
1a first valve housing part
1b second valve housing part
1c first clamping flange
2 seat ring
3a first seat surface (cylindrical seat surface)
2b second seat surface (axial; radial; axial/radial)
2c connection opening
2d annular recess
3 first closing member (slide piston)
3* first cylindrical attachment
3a first adjustment rod
3b/3c pipe shaft
3b connection part
3c pressure compensation piston
3d outlet bore
3e radial recess (recess)
3f axially limited annular and grove-shaped recess
30 weld-on part
3a* adjustment rod section
3g ring
3h cross beam
4 second closing member
4* second cylindrical attachment
4a second adjustment rod
5 leakage cavity
6 first seat seal (radial)
7 second seat seal (axial; radial; axial/radial)
8 center seal (axial; in second closing member 4)
9 second rod seal
11 second guide ring
12 lamp housing
12a second clamping flange
13 clamping ring
14 seal ring housing and guide ring housing
15 housing seal
20 outlet housing
20a third clamping flange
20b housing bore
20c inner radial recess
20d outlet opening
20e notch
20f seal groove
21 first rod seal
21a elastic seal part
21a.1 circumferential, V-shaped seal edge
21a.1* sealing position of the circumferential seal edge
21a.2 seal shoulder
21a.3 rebounding seal flange
21b rigid insertion part
21b.1 free end section of the insertion part
22 first guide ring
22a guide bore
22b groove
23 seal
α gradient angle
d1 pipe shaft diameter or balancer diameter
d3 diameter of the outlet housing bore
D3 first restricting gap
D4 second restricting gap
H full opening stroke (fully opened position)
K outer surface of the pipe shaft 3b/3c or of the pressure compensation piston 3c
R seal cleaning current (R(S21))
R1 first seat cleaning current (R1(D3))
R2 second cleaning current (R2(D4)
S20 outlet ring gap
S21 (temporarily formed) ring gap
S22b groove-shaped through-gap
T1 first partial stroke (first partially open/seat cleaning position)
T2 second partial stroke (second partially open/seat cleaning position)

The invention claimed is:

1. A double seat valve provided with first and second closing members (3, 4) arranged in series, which are movable relative to each other and which prevent in the closed position of the double seat valve (1) overflowing of fluids from a first valve housing part into another valve housing part (1b; 1a), which are limited in the closed but also in the opened position by a leakage cavity (5) that is connected with the area surrounding the double seat valve (1), wherein in the closed position of the first closing member (3) which is constructed as a slide piston, the member is sealingly accommodated in a connection opening (2c) of interconnecting valve housing parts (1a, 1b) and comes to rest during its opening movement on a second closing member creating a seal, which is arranged on a second seat surface (2b), so that the second closing element is also transferred during further opening movement into a fully opened position (H), wherein the first closing member (3) is equipped with a seat valve (6) creating a seal against a cylindrical seat surface (2a) formed radially relative to a connection opening (2c), with the closing members (3, 4), which can be transferred independently of each other with a respective first partial stroke (T1) and second partial stroke (T2), in each case gap-wide into a seat cleaning position in order to clean their seat surfaces (2a, 2b), wherein the second closing member (4) can be transferred with the second partial stroke (T2) which is equidirectional with the opening movement, along with the first closing member (3) with the opening movement against the first partial stroke (T1) into the respective seat cleaning position, wherein the double seat valve (1) is opened upward relative to a vertical arrangement and is equipped with a drive having actuating adjustment rods (3a, 4a), jointly actuating both closing members (3, 4), wherein an outlet bore (3d), which is provided in a penetrating pipe shaft (3b/3c) creating a seal in the downward direction with the first valve housing part (1a) arranged in a valve housing part (1a) deployed on the first closing member (3), connects the leakage cavity (5) with the surroundings, and wherein the seat cleaning position of the first closing member (3) is at the same time opened and can be cleaned in the sealing position between the pipe shaft (3b/3c) and the first valve housing part (1a), wherein the first closing member (3), which is moved downward with the first partial stroke (T1), is provided with a freely penetrable ring gap (S21) which is formed between an outer surface (K) of the pipe shaft (3b/3c) and a first rod seal (21) arranged in an axial direction in the first valve housing part (1a).

2. The double seat valve according to claim 1, the first rod seal (21) is constructed as a profile seal, which is provided with a substantially polygonal profile; wherein two sides opposite each other, relative to a vertical arrangement position of the double seat valve (1), are substantially vertically oriented, a radial outer limiting surface and a lower limiting surface of the first rod seal (21) are limited, with the exception of the first closing member (3) in the seat cleaning position, by the pipe shaft (3*b*/3*c*), and an upper limiting surface of the first rod seal is freely exposed to an inner space of the first valve housing part (1).

3. The double seat valve according to claim 1, wherein the first rod seal (21) comprises an elastic seal part (21*a*) and a rigid insertion part (21*b*).

4. The double seat valve according to claim 3, wherein the insertion part (21*b*) is extended, relative to the cross-section of the first rod seal (21), upward and radially outward in the upward direction and radially inward, and a lower end of the insertion part (21*b*) forms one part of the lower limiting surface of the first rod seal (21), with a free end section (21*b*.1) of the insertion part (21*b*) protruding through the radial outer limiting surface of the first rod seal (21), the insertion part (21*b*) being fixed with its free end section (21*b*.1) so that a form-lock or a form and force-lock is created on the side of one of the valve housing parts.

5. The double seat valve according to claim 2, wherein a seal shoulder (21*a*.2) is formed on the radially outer limiting surface of the first rod seal (21), which is braced toward the inner space of the first valve housing part (1*a*) against this part.

6. The double seat valve according to claim 2, wherein the first rod seal (21) is equipped on a radially inner limiting surface with a radially outwardly projecting, circumferential, V-shaped seal edge (21*a*.1), to which is joined an inwardly projecting, circumferential and outwardly rebounding seal flange (21*a*.3).

7. The double seat valve according to claim 1, wherein the temporarily formed ring gap (S21) is limited on an inner side by the outer surface (K) of the pipe shaft (3*b*/3*c*), having a contour which is essentially determined as a counter-contour to the adjacent contour of the first rod seal (21), when it is exposed to the pipe shaft (3*b*/3*c*) and pressure is released.

8. The double seat valve according to claim 6, wherein the circumferential, V-shaped seal edge (21*a*.1) is positioned in the area of a radial recess (3*e*) or in an axially limited annular and groove-shaped notch (3*f*), formed respectively on a peripheral surface of the rear shaft (3*b*/3*c*), and that the rear shaft (3*b*/3*c*), which has an undiminished diameter under the recess (3*e*) or the notch (3*f*), forms with the rebounding seal flange (21*a*.3) a lower part of the ring gap (S21).

9. The double seat valve according to claim 1, wherein the pipe shaft (3*b*, 3*c*) is constructed in the form of a pressure compensation piston in the region penetrating the first rod seal (21), having an annular surface on the front side which is oriented toward the first closing member, the annular surface being approximately identical to an adjacent annular surface on a lower side of the first closing member (3).

10. The double seat valve according to claim 1, wherein a box-shaped outlet housing (20), which is extended downward, is detachably joined to the first valve housing part (1*a*), so that the pipe shaft (3*b*/3*c*) is entirely accommodated on an inner side in an housing bore (20*b*) and surrounded by an outlet ring gap (S20) along its entire accommodated length.

11. The double seat valve according to claim 10, wherein one front side of the outlet housing (20) oriented toward the first rod seal (21) borders the insertion part (21*b*) radially on an outer side and is adjacent on an inner side to a radially, downwardly extended, rectangular, circumferential notch (20*e*) in the housing bore (20*b*), and that a first guide ring (22) is arranged in the notch (20*e*), which is penetrating on the inner side into a guide bore (22*a*) of the pipe shaft (3*b*/3*c*) and which lies with an upper limiting surface on a front side to the elastic seal part (21*a*) of the first rod seal (21) under pretensioning.

12. The double seat valve according to claim 11, wherein a plurality of grooves (22*b*) are provided in the guide bore (22*a*) so that they are distributed over its circumference, having a longitudinal axis positioned at a gradient angle α opposite the parallel boundary surfaces of the first guide ring (22) on the front side.

13. The double seat valve according to claim 11, wherein a seal groove (20*f*) is provided in the limiting surface on a front side of the notch (20*e*), in which a sealing seal (23) is accommodated opposite the first guide ring (22).

14. The double seat valve according to claim 10, wherein the outlet housing (20) ends on its lower end radially on the inner side in an inner radial projection (20*c*), which surrounds an outlet opening (20*d*), which in the closed position or in the seat cleaning positions of the double seat valve (1) is penetrated by a ring (3*g*), which is connected at the end side to the pipe shaft (3*b*/3*c*), from which the outlet bore (3*d*) is opened in the downward direction and radially inward.

\* \* \* \* \*